(12) United States Patent
Demidovitch et al.

(10) Patent No.: US 6,259,071 B1
(45) Date of Patent: Jul. 10, 2001

(54) SINGLE-POINT TEMPERATURE CONTROL SYSTEM FOR A MULTI-SECTION LINE FURNACE

(75) Inventors: Victor B. Demidovitch, Pittsburgh; Eric Blake, Sewickley; Robert P. Churchill, Pittsburgh, all of PA (US)

(73) Assignee: Bricmont, Inc., Cannonsburg, PA (US)

( * ) Notice: Subject to any disclaimer, the term of this patent is extended or adjusted under 35 U.S.C. 154(b) by 0 days.

(21) Appl. No.: 09/411,437

(22) Filed: Oct. 1, 1999

(51) Int. Cl.[7] ...................................... H05B 1/02
(52) U.S. Cl. ..................... 219/486; 219/483; 148/698; 148/508; 266/103
(58) Field of Search .................... 219/483, 486, 219/485, 497, 506; 392/416; 148/DIG. 80, 698, 128, 549, 700, 498, 511, 508; 266/87, 103

(56) References Cited

U.S. PATENT DOCUMENTS

| | | | |
|---|---|---|---|
| 3,496,033 | * | 2/1970 | Gilbreath, Jr. et al. ............... 148/13 |
| 4,011,430 | * | 3/1977 | Witkin et al. ......................... 219/486 |
| 5,551,670 | * | 9/1996 | Heath et al. ........................... 266/87 |
| 6,117,266 | * | 9/2000 | Horzel et al. ......................... 156/345 |

* cited by examiner

Primary Examiner—Mark Paschall
(74) Attorney, Agent, or Firm—Clifford A. Poff

(57) ABSTRACT

A single-point temperature control system is used with a multi-section furnace to control the exit temperature of a metal workpiece discharged from the furnace. The furnace consists of at least first, second and third sections. The temperature is sensed at the single temperature set point in the second section and compared with a desired set point temperature. The power to the second section is adjusted in order to maintain the desired set point temperature so that the metal workpiece exits the furnace at the required temperature.

19 Claims, 2 Drawing Sheets

SINGLE-POINT TEMPERATURE CONTROL SYSTEM FOR A MULTI-SECTION LINE FURNACE

CROSS-REFERENCE TO RELATED APPLICATIONS

Not applicable.

BACKGROUND OF THE INVENTION

1. Field of the Invention

The present invention relates to a control system for a furnace used to heat metal workpieces in a generally continuous manner to a predetermined furnace discharge temperature incident to processing of the metal workpiece, and more particulary to a method and apparatus providing a single-point temperature control for a multi-section workpiece heating furnace to heat a metal workpiece continuously traveling through the furnace without adverse influences arising out of changing dimensions to the thickness of the workpiece being processed.

2. Description of Related Art

It is well known in the art to continuously advance a metal workpiece in a furnace having a plurality heating chambers to heat the metal workpiece to a desired furnace discharge temperature for achieving an intended thermal treatment which can be part of a more extensive metal working processes, for example, for heat treating, annealing and galvanizing processes. Furnaces for such processes are usually in the form of a tandem arranged sections. The initial heating stage serves to clean by combustion of contaminants on the surface of the workpiece and thereafter additional heating stages continue heating of the metal workpiece so that the workpiece is discharged from the furnace at a desired or predetermined temperature.

The metal workpiece may be wire or any of a variety of structural shapes, coiled strip, and metal sheets. In a continuous annealing and galvanizing lines, a metal strip is processed in an endless fashion by supplying metal strip from discrete coils having the terminal end of one coil welding or secured to the trailing end of a next coil to be processed. A furnace for heating such a continuous strip when made up of multi-section furnace sections, is typically made up of at least three furnace sections that function to heat the strip in a first furnace section sufficient to clean contaminants from the strip. A second furnace section further heats the strip to a temperature below the desired furnace discharge temperature which is subsequently obtained by further heating in a subsequent, third furnace section. An example of such a multi section heating furnace is found in Japanese Patent Publication 57-19336 laid open Feb. 1, 1982 for a continuous annealing facility in which the strip is supplied to a gas heating zone followed by an induction heating zone and then supplied to a soaking zone. Temperature detections are provided before and after the induction heating zone for supplying signals to a temperature controller. The controller also receives reference value of target strip temperature, welding point, line speed, thickness and width.

Temperature sensors, such as infrared and optical pyrometers, are used to measure the temperature of the strip at each of multiple locations along the furnace in continuous processing line. A temperature sensor is typically located at the entrance or exit of a furnace section in a multi section furnace. The workpiece temperature measurements are then used to adjust the temperatures in the furnace section to achieve a desired workpiece discharge temperature.

In one prior art galvanealing furnace with a fossil-fueled, direct-fired first furnace section, followed by an electric induction heating coil second furnace section, in turn, followed by a fossil-fueled, radiant tube heating section, has at least one temperature sensor located in each of the three furnace sections. The outputs of the temperature sensors are entered to a computer system, along with the width and thickness of the workpiece. A heating algorithm is executed within the computer to command the power outputs of the first, second and third furnace sections. The computer control system used to modify the operation of all three furnace sections includes a temperature sensor associated with each furnace section. The control system produces changes to the operation by all three furnace sections and is therefore believed unduly complex to such an extent that the control system could become unstable due to continuous corrections particularly by the third furnace section. The instability could be greater by additionally involving the second furnace section due to a cascading effect introduced by changes at the first furnace section either by the control or changes to thickness or other properties of the strip.

It is an object of the present invention to provide a rapidly responsive single-point temperature control system to maintain a predetermined workpiece temperature at a predetermined measurement site in a control furnace section which adjusts for temperature deviations to an incoming workpiece by a preceding furnace section to assure the delivery of a workpiece with a predetermined temperature from a following furnace section.

It is another object of the present invention to establish by use of a mathematical expression a desired temperature set point in a second furnace section of a tandemly arranged first, second and third furnace sections for control of the second furnace section for delivering workpieces from a third furnace section at a predetermined desired temperature.

It is another object of the present invention to maintain a desired exit furnace temperature for a workpiece by maintaining a constant temperature at a predetermined fixed point in a second furnace section at a location dependent upon the active lengths of three furnace sections and the average specific heating powers of the first and third furnace sections of the furnace.

It is a further object of the present invention to maintain a desired workpiece discharge temperature from a furnace by maintaining a fixed measurement point temperature at a site along a second of three tandemly arranged furnace sections using a control dependent upon the required output temperature of the workpiece, the temperature of the workpiece at the entrance to the furnace, the active lengths of the first and third furnace sections, and the average specific heating powers of the first and third heating sections of the furnace.

BRIEF SUMMARY OF THE INVENTION

More particularly according to the present invention there is provided a method for controlling the discharge temperature of a metal workpiece heated in a furnace, the method including the steps of providing a tandem arrangement of first, second and third furnace sections having separate furnace controls for heating a length metal workpiece while a resident in each such furnace section, controlling each of the first and third furnace sections to provide substantially constant furnace operating temperatures for heating a length of a metal workpiece when resident therein, establishing a workpiece temperature measurement site along a path of travel by a metal workpiece during heating in the second furnace section, maintaining a predetermined constant metal workpiece temperature at the workpiece temperature measuring site by rapidly adjusting heating of the metal workpiece by the second furnace section, the second furnace section receiving a heated length of the metal workpiece after heating by the first furnace section and delivering the length of metal workpiece after further heating by the second furnace section, the heating by the second furnace section including heating the workpiece sufficiently to attain the predetermined constant metal workpiece temperature at the measuring site, and heating the metal workpiece after discharge from the second furnace section in the third furnace section at the substantially constant furnace operating temperature for discharge therefrom at a predetermined desired furnace exit temperature.

According to the present invention there is also provided a method for controlling the exit temperature of a metal workpiece heated in a furnace, the method including the steps of providing a tandem arrangement of an i-furnace section, a set point temperature furnace section and a j-furnace section, establishing a substantially constant furnace operating temperature in each of the i-furnace section and j-furnace section for heating a metal workpiece therein, providing the set point temperature furnace section with a rapidly adjustable metal workpiece heating, defining the location of a temperature set point from the entry end of the set point temperature furnace section according to the equation:

$$x = \frac{b}{\left(1 + \frac{\sum_i (c_i \cdot p_i)}{\sum_j (a_j \cdot p_j)}\right)}$$

where:

$x$=the approximate distance of the set point from the entrance to the second furnace section (m);

$a_j$=the active length (m) of the j-furnace section located before the set point temperature furnace section;

j=an integer 1 . . . n corresponding to the number of furnace sections located before the set point furnace temperature section;

b=the active length (m) of the set point temperature furnace section;

$c_i$=the active length (m) of the i-furnace section located after the set point temperature furnace section;

i an integer 1 . . . n corresponding to the number of furnace sections located after the set point furnace temperature section;

$p_j$=the average specific heating power of the j-furnace section (W/cm²); and $p_i$=the average specific heating power of the i-furnace section (W/cm²); establishing an approximate desired temperature at the set point according to the equation:

$$T_s = T_o + \frac{T_f - T_o}{\left(1 + \frac{\sum_i (c_i \cdot p_i)}{\sum_j (a_j \cdot p_j)}\right)}$$

where:

T=the desired temperature at the set point (°C.);

$T_o$=the temperature (°C.) of a workpiece entering the j-furnace section wherein j=1;

$T_f$=the desired temperature (°C.) for a metal workpiece discharged from the i-furnace section; and controlling the temperature of a metal workpiece discharged from the i-furnace section by rapidly adjusting metal workpiece heating by the set point temperature furnace section to maintain the desired temperature at the set point.

According to a further aspect of the present invention there is provided a temperature control system for controlling the exit temperature of a metal workpiece from a multi-section line furnace including at least first, second and third furnace sections, the temperature control system including the combination of a temperature sensor to provide an output signal corresponding to a measure of the temperature of the metal workpiece at a preestablished temperature set point within the second furnace section, a comparator responsive to the output signal and a desired set point temperature signal for providing a temperature set point control signal, and a furnace heating controller responsive to the temperature set point control signal for altering heating of a workpiece by the second furnace section in a manner to maintain a predetermined workpiece temperature at the preestablished temperature set point within the second furnace section.

In such a temperature control system there may additionally provide a line speed controller for altering line speed in the event of a required power level exceeding a power of the second furnace section when the second furnace section includes a workpiece heater having an operating range defined by minimum and maximum power levels to an effective heating of a workpiece.

The present invention also provides an apparatus to control a set point temperature in a furnace for heating workpieces, the apparatus including the combination of, at least three tandem furnace sections arranged as a downstream furnace section, a set point control furnace section and a upstream furnace section for successively treating a workpiece, each of the downstream furnace section and the upstream furnace section being controlled for maintaining substantially constant furnace operating temperatures to deliver a workpiece from the downstream furnace at an elevated temperature sufficient for further heating by the set point control furnace section such that further modification to the workpiece temperature by the upstream furnace section provides a workpiece with a predetermined desired temperature from the upstream furnace section, a temperature sensor for providing a measurement signal corresponding to a workpiece temperature at a predetermined site within the set point control furnace section, and a control responsive to a deviation of the measurement signal from a predetermined set point temperature signal for controlling the set point control furnace section to maintain a substantially constant workpiece temperature at the predetermined site within the set point control furnace section.

BRIEF DESCRIPTION OF THE SEVERAL VIEWS OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
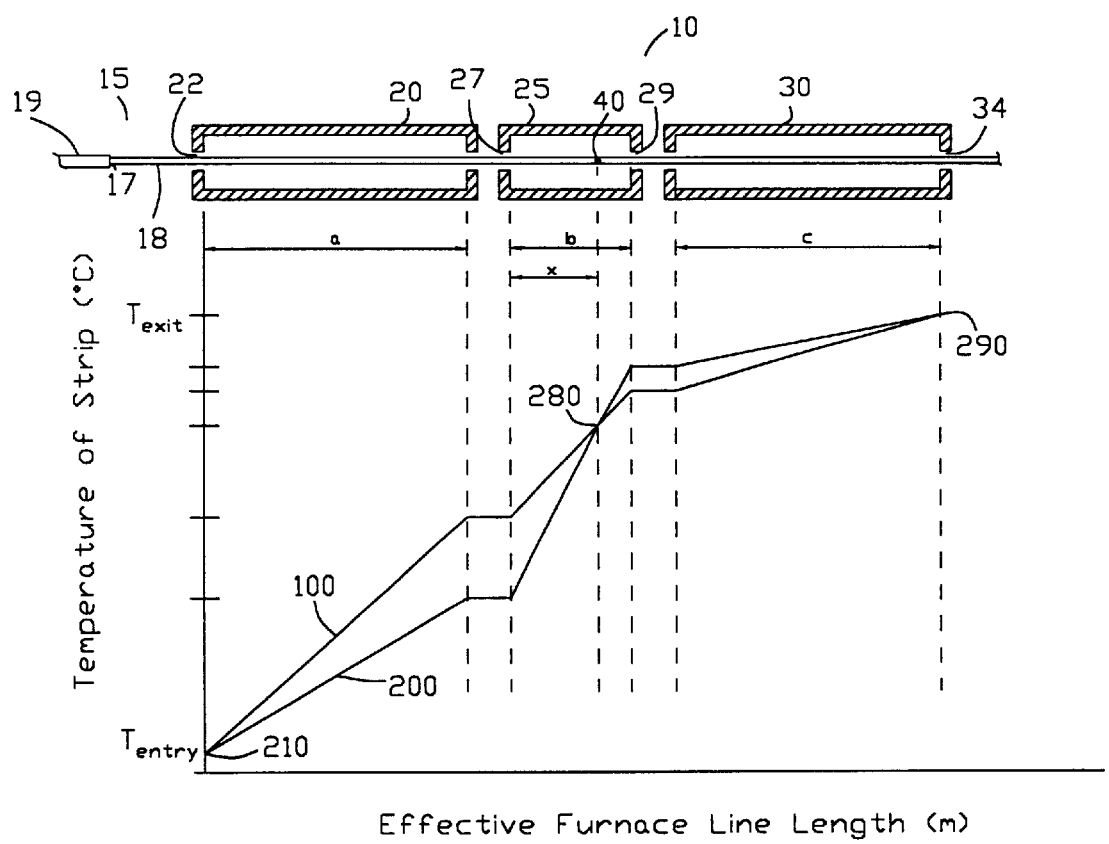
FIG. 1 is a schematic illustration of a furnace having multiple furnace sections shown with graph lines representing the temperature of a metal strip at points along the effective length of each of the multiple furnace sections utilizing the single-point temperature control system for heating a metal workpiece according to the present invention.
Figure 2:
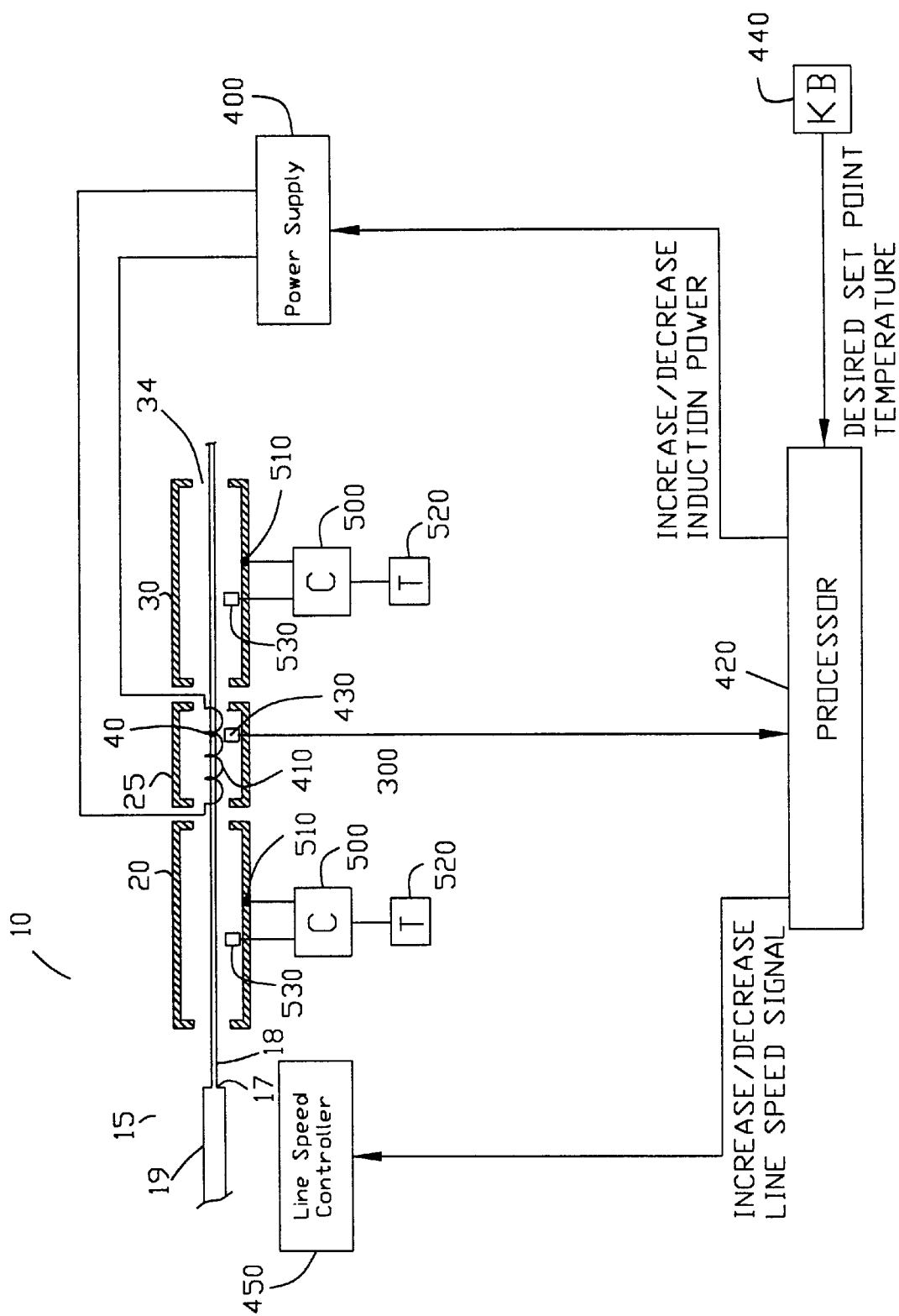
FIG. 2 is a diagrammatic illustration of the single-point temperature control system according to the present invention.

In FIGS. 1 and 2 of the drawings like reference numerals identify like elements. There is shown in FIG. 1 furnace 10 which is made up of three tandemly arranged furnace sections identified as furnace section 20, a second furnace section 25 and a third furnace section 30. The first furnace section 20 is an upstream furnace section in relation to the second furnace section 25 and the third furnace section 30 is a downstream furnace section in relation to the third furnace section 25. Furnace 10 is useful for annealing a metal strip and as such is not directly associated with allied strip processing lines. Alternatively the furnace 10 is also useful for heating a metal strip as part of a galvanizing processing line or similar forms of strip processing involving treatments of the metal strip after delivery from the furnace and/or before entry into the furnace. Typically the furnace 10 is used to process a metal workpiece continuously such as supplied by coils of wire or strip that may have a varying workpiece thicknesses and/or width from coil to coil. Moreover, as is well known, the thickness of the metal strip may vary along the length of the strip comprising a single coil. The metal workpiece will be referred to as continuous metal strip 15 and a skilled artisan will appreciate that the temperature control system of the present invention is applicable for heating other well known forms and types of metal workpieces which can be ferrous or nonferrous. It is to be understood that the entry end of the first furnace section 20 there is provided conventional well-known forms of handling the equipment for uncoiling a strip and welding the trailing end of a strip coil to the leading end of the next coil to be fed into the furnace. Such coil handling equipment may be situated immediately at the entrance of the furnace 10 or at the entry end of intervening strip processing equipment.

The continuous metal strip 15 is shown diagrammatically as consisting of a thin metal strip 18 welded at the trailing end portion to the leading end of a relatively thick metal strip 19 along weld line 17 located at the entrance to the first furnace section 20. The first furnace section 20 may be a fossil-fueled, direct-fired furnace with open flame burners. The second furnace section 25 may utilize an inductor coil; a group of electric induction heating coils; or any other heating technology that can be arranged to provide a rapid change in the average heating power of the furnace. The third furnace section 30 may be a fossil-fueled, radiant tube-fired furnace. Each of the furnace sections 20, 25 and 30 may utilize one or more induction heating coils. While the direct-fired and radiant tube-fired sections are typically fired by fossil fuel and the intermediate heating is accomplished by electric induction heating, the artisan will appreciate that the specific heat sources are not restrictions to practicing the invention. Each of the furnace sections is preferably provided with a high temperature refractory lining, which is not essential for the practice of the present invention. The first furnace section 20 generally applies direct heat to a strip 15 along the active length of the first furnace section 20. The strip entry temperature into the first furnace section 20 is typically, but not required to be, at the ambient temperature outside the furnace. In the event a strip preheat furnace section is used at the entrance of the first furnace section 20, then the strip entry temperature will be the strip delivery temperature from the strip preheat furnace. The orientation of the sections of the furnace relative to each other is not significant with respect to the invention. For example, first furnace section may be positioned at an angle of 90 degrees relative to the second and third heating sections. The third furnace section 30 generally applies indirect radiant heat to the strip 15 to heat further and "soak" the strip at a temperature that will cause the strip to exit the furnace at the required process temperature. According to the present invention, it is intended that the strip 15 exit the furnace at a required temperature which is achieved by insuring the strip enters the third furnace section within a predetermined temperature that can vary within a range of 5% preferably less than 2%. The strip 15, after exiting the furnace 10, is coiled or further processed by apparatus suitable for the specific process, such as galvanizing or other metal treatments as known in the art.

In FIG. 1, active lengths of the three furnace sections 20, 25 and 30 of the furnace 10 are denoted as a, b and c and correspond approximately to the length of the strip 15 exposed to the average specific heating power within the heating chamber of each furnace section. Strip support rollers, not shown, are provided to support the strip passage from one furnace section to the next furnace section and during passage in each of the furnace sections. In the embodiment of the invention shown in FIG. 1, the passline for the strip 15 through all of the furnace sections is a generally straight line although strip support rollers may be arranged at opposed and spaced apart locations to provide a great resident time for strip in the furnace sections.

The spacing between two adjacent furnace sections is preferably thermally insulated and made short as possible to avoid heat loss. In the graph portion of FIG. 1, the temperature of the strip passing between the furnace sections is shown as substantially constant although an insignificant heat loss is likely to occur.

A Fourier equation is formulated to express a time-dependent heat transfer process in a metal workpiece traveling through the multi-section furnace as:

$$Q = C \cdot \gamma \cdot \left(\frac{\partial T}{\partial t}\right) + div(-\lambda \cdot gradT) \qquad \text{Equation (1)}$$

where:
  Q=the heat source density per unit time in a unit volume;
  C=the specific heat;
  γ=the density of the metal;
  T=the temperature of strip 15; and
  λ=the thermal conductivity of the metal.

The temperature of the strip T is assumed to be constant throughout the strip thickness within the practical range of strip thicknesses and thus the term grad T=0 whereby the component div.(−λ•grad T) of Equation (1) is equal to 0. Using this assumption, the Fourier equation is used to establish a system of equations simplified to yield the following equation for defining the location of single temperature set point 40 for the strip 15 in the second furnace section 25 when the metal strip moves through the furnace at constant speed:

$$x = \frac{b}{\left(1 + \left(\frac{c}{a}\right) \cdot \left(\frac{p_3}{p_1}\right)\right)} \qquad \text{Equation (2)}$$

where:
  x=the distance along the heating chamber from the entry end 27 of the second furnace section 25 to the site of the single temperature set point 40;

a=the active length of first furnace section 20;

b=the active length of second furnace section 25;

c=the active length of third furnace section 30;

$p_1$=the average specific heating power of the first furnace section 20; and $p_3$=the average specific heating power of the third furnace section 30.

Generally, the numerical value for the distant x may be defined with an allowable tolerance of ±5 percent without material deviation to the desired furnace exit temperature 290.

The average specific heating power for any furnace section is defined by the following equation:

$$p = \Upsilon \cdot C \cdot d \cdot (Texit - Tentry) \cdot \left(\frac{v}{l}\right) \qquad \text{Equation (3)}$$

where:

γ=the density of the metal;

C=the specific heat of the metal;

d=the thickness of the strip;

Texit=the temperature of the strip at the third furnace section;

Tentry=the temperature of the strip at the first furnace section;

v=the linear speed of the strip through the furnace; and l=the active length of the furnace section.

The relationship between the terms d, Texit, Tentry and v is a constant defined by the following equation:

$$k = d \sim (Texit - Tentry) \sim v \qquad (4)$$

In the event the strip thickness or the linear speed of the strip through the furnace changes, the constant k produces the result of a corresponding change to the term (Texit−Tentry. The values of γ and C vary with the specific metallurgical property of the strip but the magnitude to the variation is relatively small and will not produce a significant effect to the range of acceptable control by the second furnace section.

The single set point temperature 280 is calculated from the following formula:

$$T_s = T_0 + \frac{T_f - T_0}{\left(1 + \left(\frac{c}{a}\right) \cdot \left(\frac{p_3}{p_1}\right)\right)} \qquad \text{Equation (5)}$$

where:

T=the set point temperature;

$T_o=T_{entry}$, the furnace entry temperature 210 of the strip;

$T_f=T_{exit}$, the furnace exit temperature 290 of the strip;

a=the active length of first furnace section 20;

c=the active length of third furnace section 30;

$p_1$=the average specific heating power of the first furnace section 20; and $p_3$=the average specific heating power of the third furnace section 30.

The foregoing Equations (2) and (5) are site specific for a furnace having three furnace sections. The present invention is defined for a furnace having greater than three furnace sections by a tandem arrangement consisting of i-furnace sections, a set point temperature furnace section and j-furnace sections. Substantially constant furnace operating temperatures are established for each of the i-furnace sections and the j-furnace sections for heating a metal workpiece therein and the set point temperature furnace section is constructed to rapidly adjust metal workpiece heating. The location of a temperature set point from the entry end of the set point temperature furnace section is defined according to the equation:

$$x = \frac{b}{\left(1 + \frac{\sum_i (c_i \cdot p_i)}{\sum_j (a_j \cdot p_j)}\right)} \qquad \text{Equation (6)}$$

where:

x=the approximate distance of the set point from the entrance to the second furnace section (m);

$a_j$=the determination of an active length (m) of the j-furnace section located before the set point temperature furnace section;

j=an integer 1 . . . n corresponding to the number of furnace sections located before the set point furnace temperature section;

b=the determination of an active length (m) of the set point temperature furnace section;

$c_i$=the determination of an active length (m) of the i-furnace section located after the set point temperature furnace section;

i=an integer 1 . . . n corresponding to the number of furnace sections located after the set point furnace temperature section;

$p_j$=the determination of an average specific heating power of the j-furnace section (W/cm$^2$); and $p_i$=the determination of an average specific heating power of the i-furnace section (W/cm$^2$);

Under the circumstances of providing a furnace having i and j furnace sections separated by the set point furnace temperature section, the approximate desired temperature at a set point established within the set point furnace temperature section is determined according to the equation:

$$T_s = T_o + \frac{T_f - T_o}{\left(1 + \frac{\sum_i (c_i \cdot p_i)}{\sum_j (a_j \cdot p_j)}\right)} \qquad \text{Equation (7)}$$

where:

$T_s$=the desired temperature at said set point (°C.);

$T_o$=the determination of the metal workpiece entry temperature for said j-furnace section wherein j=1 (°C.); and $T_f$=the determination of a desired exit temperature for a metal workpiece from said i-furnace section (°C.).

By Equations (6) and (7), the furnace is responsive to controlling the temperature control of a metal workpiece discharged from the last furnace section of the i-furnace sections by maintaining the desired temperature at the set point using the rapidly adjustable metal workpiece heating by the set point temperature furnace section.

In FIG. 1, curves 100 and 200 represent the typical heating profiles of two strips traveling through the furnace. Each of the two curves represents the temperature of a strip 15 as it travels through the furnace. The x-coordinate on the curve is referred to as the effective furnace line length coordinate. Curve 100 represents the temperatures for a strip that is thinner than the strip represented by curve 200. The two curves shown in FIG. 1 represent two curves in a family of curves that represent strips of different thicknesses and widths. A feature of the present invention resides in the provision that curves 100 and 200 belong to a family of curves which pass through the fixed temperature set point 280. A strip enters the first furnace section 20 at the furnace entry point 22. The curve commences with a strip entry temperature at point 210 at ambient temperature or at an elevated strip temperature through the operation of a preheat furnace. In a continuous line process, as mentioned above, the strip of different thicknesses from consecutive coils is supplied continuously to the furnace by welding the end of a depleted coil to the leading end of a successive coil. In FIG. 1 a relatively thin strip 18 is joined at weld 17 to a thicker strip 19. With this arrangement of strip, curve 100 represents the temperature profile of the thinner strip 18 and curve 200 represents the temperature profile of the thicker strip 19. However, if the strips 18 and 19 are maintained at the temperature 280 at the temperature set point 40 as they travel through the furnace, both strips will exit the furnace at furnace exit 34 at the appropriate processing temperature. This furnace exit temperature control can maintain the exit temperature 290 shown in FIG. 1 for strips of varying thickness, and with varying furnace line speeds while the temperatures of the first and third furnace sections are held constant.

A distance x will equal 2.0 meters when the following typical parameters for a furnace having three furnace sections to heat a carbon steel strip for producing a hot dip-galvanized product are applied in Equation (2): a=16 m; b=2.4 m; c=20 m; $p_1$=16.8 W/cm$^2$; and $p_3$=2.7 W/cm$^2$. Using Equation (3), the average specific heating power P1 will equal 16.8 W/cm$^2$ with Texit=560° C. and Tentry=20° C. when the following typical parameters are applied to a strip with $\gamma$=7.87×10$^{-3}$ kg/cm$^3$; C=540 J/(kg°C.); d=0.078; and v=150 cm/sec. The average specific heating power $p_3$ is 2.7 watts per centimeter squared for a third furnace section given that Texit equals 730° C. and Tentry equals 620° C.

In a furnace that deviates from a straight passline through one or more of the furnace sections, a minor, alteration to the distance "x" establishing fixed point location 280 may be required. The control of the operation of the second furnace section based on maintaining the preestablished temperature at this unique single temperature set point provides the desired exit temperature of the strip from the furnace with varying thicknesses and widths.

The required strip temperature for a galvanized product known as Construction Quality (CQ) is approximately 730° C. Other typical desired furnace exit temperatures for the galvanizing process are approximately 550° C. for Full Hard (FH) product, and approximately 840° C. for Drawing Quality (DQ) product. A typical range of line speeds for the multi-section furnace in FIG. 1 is between approximately 70 and 500 feet per minute. The strip thickness is typically in the range of 0.015 to 0.13 inches for strip ranging in width between 36 and 73 inches. Typical operating temperatures for the first and third furnace sections are 1,260° C. and 955° C., respectively. By way of further example, using Equation (5), the set point temperature $T_s$ is approximately equal to 611° C. in a furnace having three furnace sections where: $T_o$=20° C.; $T_f$=730° C.; a=16 m; c=22 m; $p_1$=16.8 W/cm$^2$; and $p_3$=2.7 W/cm$^2$.

Consequently, using a temperature sensor 430, such as a pyrometer, to measure the temperature at a temperature set point 40 at the distance x of 2.0 m from the entry end 27 of the second heating section 25, and maintaining the set point temperature at 611° C., the desired exit temperature for the strip issuing from the furnace will be achieved. The invention achieves this desired strip exit temperature by providing constant operating temperatures in the first and third furnace sections while only the second furnace section is rapidly controlled to maintain a constant single set point temperature at the set point 40.

In the preferred embodiment of apparatus to carryout the present invention, the second furnace section is an induction furnace. Apparatus for control of the single temperature set point is shown in FIG. 2 for a second induction furnace section. Power supply 400 provides variable levels of ac power to a single induction coil 410 shown schematically in the second furnace section based upon a predetermined set point temperature at the set point location. Although a single induction coil is shown, multiple induction coil sections can be arranged in a tandem fashion to heat the strip.

Closed-loop controllers 500 maintain set temperatures in the first and third furnace sections. For these two furnace sections, typically a thermocouple 510 is embedded in the refractory of the furnace section to measure the temperature of the furnace section. Set point temperatures are entered to the controllers by means of a thermostat 520. The desired set point temperature determined by the thermostat setting is compared with the actual furnace temperature determined by the thermocouple to derive burner control signals which are generated by the controllers 500 to increase or decrease the energy supplied to the furnace in a manner that is well known in the art.

A temperature sensor 430 supplies a measured temperature set point signal corresponding to a measure of the temperature of the strip 15 at the single temperature set point location 40 to a processor 420. The processor 420 is programmable and may comprise a computer with input and output signal processors or a programmable logic controller. A keyboard 440 supplies input data including the desired temperature set points to the processor 420.

Processor 420 uses an algorithm to establish whether the set point temperature supplied by sensor 430 is higher or lower than the desired set point temperature formed by an input to the processor. If the measured temperature set point signal is greater than the desired set point temperature, then the processor 420 supplies a control signal to the power supply 400, reducing power input to the induction coil 410 thereby to reduce heating of the strip by the second furnace section sufficiently to reestablish the required control parameter providing that the measured temperature set point signal corresponds to the desired set point temperature. If the measured temperature set point signal is less than the desired set point temperature, then the processor 420 supplies a control signal to the power supply 400, increasing power input to the induction coil 410 thereby to increase heating of the strip by the second furnace section sufficiently to reestablish the required control parameter providing that the measured temperature set point signal corresponds to the desired set point temperature. Input to the processor 420 also include limits to the power supply 400 and heating capacity of the induction heating coil 410. In the event the control signal normally supplied to the power supply 400 by the processor 420 exceed limits of the power supply or the capacity of the induction heating coil of the second furnace section, the processor 420 sends a signal to the line speed controller 450 to adjust the speed of the strip to re-home the measured temperature set point signal within limits to the control exercised by the signal supplied to the power supply 400 and function to maintain heating of the strip to the desired set point temperature at the measured temperature set point location. While the present invention takes into consideration the necessity of adjusting line speed for major changes in strip thickness (i.e., going from a thin to a relatively thick strip), under typical processing conditions, the variations in the strip thickness will be in a range that does not require a change in line speed.

While the above control process is disclosed as an automated process, the artisan will appreciate that a semiautomatic control system consisting of appropriate input and output devices for an interface with a human operator could be used. The artisan will also appreciate that the above control process can function as a modular sub-control system that is a part of a total strip line system, such as a galvanizing line. The disclosed single-point temperature control system provides a simple and efficient control of the temperature of a metal workpiece at the exit to a multi-section line furnace with varying thickness of the workpiece. The artisan will appreciate that although the invention is described relative to a galvanizing line furnace, the disclosed invention, with appropriate modifications, could be applied to other applications that involve multi-stage heating furnaces. The foregoing embodiments do not limit the scope of the disclosed invention. The scope of the disclosed invention is covered in the appended claims.

While the present invention has been described in connection with the preferred embodiments of the various figures, it is to be understood that other similar embodiments may be used or modifications and additions may be made to the described embodiment for performing the same function of the present invention without deviating therefrom Therefore, the present invention should not be limited to any single embodiment, but rather construed in breadth and scope in accordance with the recitation of the appended claims.

What is claimed is:

1. A method for controlling the discharge temperature of a metal workpiece heated in a furnace, said method including the steps of:

providing a tandem arrangement of first, second and third furnace sections having separate furnace controls for heating lengths metal workpieces having parameters of varying thicknesses or a change to the line speed of the workpieces advanced through such furnace sections;

maintaining a substantially constant operating temperature in said first furnace section for heating the lengths of workpieces having said parameters to first furnace section delivery temperatures that vary in response to said parameters;

establishing a single set point temperature at a unique workpiece temperature measurement site along a path of travel by a metal workpiece during heating in said second furnace section;

rapidly adjusting heating of workpieces having said parameters to always maintain a predetermined constant workpiece temperature at said workpiece measuring site, the second furnace section heating workpieces having said parameters to differing delivery temperatures; and maintaining a substantially constant operating temperature in said third furnace section for heating lengths of workpieces having said parameters to a third furnace section delivery temperature which is predetermined and substantially constant for workpieces having such parameters operating temperature.

2. The method according to claim 1 including the further step of advancing a metal workpiece through said first, second and third furnace sections at a substantially constant rate of travel.

3. The method according to claim 2 wherein said step of maintaining a predetermined constant metal workpiece temperature at said workpiece temperature measurement site includes changing said substantially constant rate of travel from a first velocity to a second velocity.

4. A method for controlling the discharge temperature of a metal workpiece heated in a furnace, said method including the steps of:

providing a tandem arrangement of first, second and third furnace sections having separate furnace controls for heating a length metal workpiece while resident in each such furnace section;

advancing a metal workpiece through said first, second and third furnace sections at a substantially constant rate of travel controlling each of said first and third furnace sections to provide substantially constant furnace operating temperatures for heating a length of a metal workpiece when resident therein;

establishing a workpiece temperature measurement site along a path of travel by a metal workpiece during heating in said second furnace section;

establishing limits to the supply of electrical power for heating a metal workpiece in said second furnace section;

maintaining a predetermined constant metal workpiece temperature at said workpiece temperature measuring site by rapidly adjusting heating of said metal workpiece by said second furnace section by changing said substantially constant rate of travel of a workpiece from a first velocity to a second velocity to prevent exceeding said established limits to the supply of electrical power, said second furnace section receiving a heated length of the metal workpiece after heating by said first furnace section and delivering the length of metal workpiece after further heating by said second furnace section, the heating by the second furnace section including heating the workpiece sufficiently to attain said predetermined constant metal workpiece temperature at said measuring site; and heating the metal workpiece after discharge from said second furnace section in said third furnace section at the substantially constant furnace operating temperature for discharge therefrom at a predetermined desired furnace exit temperature.

5. A method for controlling the discharge temperature of a metal workpiece heated in a furnace, said method including the steps of:

providing a tandem arrangement of first, second and third furnace sections having separate furnace controls for heating a length metal workpiece while resident in each such furnace section;

controlling each of said first and third furnace sections to provide substantially constant furnace operating temperatures for heating a length of a metal workpiece when resident therein;

establishing an average specific heating power to define heating of a metal workpiece by said first furnace section; establishing an average specific heating power to define heating of a metal workpiece by said third furnace section; and using the established average specific heating power for each of said first furnace section and said third furnace section for establishing a workpiece temperature measurement site along a path of travel by a metal workpiece during heating in said second furnace section maintaining a predetermined constant metal workpiece temperature at said workpiece temperature measuring site by rapidly adjusting heating of said metal workpiece by said second furnace section, said second furnace section receiving a heated length of the metal workpiece after heating by said first furnace section and delivering the length of metal workpiece after further heating by said second furnace section, the heating by the second furnace section including heating the workpiece sufficiently to attain said predetermined constant metal workpiece temperature at said measuring site; and heating the metal workpiece after discharge from said second furnace section in said third furnace section at the substantially constant furnace operating temperature for discharge therefrom at a predetermined desired furnace exit temperature.

6. The method according to claim 5 including the further steps of establishing an active furnace length to define heating of a metal workpiece by said first furnace section; establishing an active furnace length to define heating of a metal workpiece by said second furnace section; establishing an active furnace length to define heating of a metal workpiece by said third furnace section; and using the established active furnace length for each of said first furnace section, said second furnace section and said third furnace section for said step of establishing a workpiece temperature measurement site.

7. The method according to claim 5 including the further steps of establishing a metal workpiece entry temperature of a metal workpiece entering said first furnace section; establishing a desired furnace exit temperature for a metal workpiece discharged from said third furnace section; establishing an active furnace length to define heating of a metal workpiece by said first furnace section; establishing an active furnace length to define heating of a metal workpiece by said third furnace section; and establishing a set point temperature to define said predetermined constant metal workpiece temperature by using said metal workpiece entry temperature, said furnace exit temperature, said active furnace length for each of said first furnace section, and said third furnace section.

8. The method according to claim 1 wherein temperature increases imparted to a metal workpiece by heating in each of said first and second furnace sections are substantially greater than the temperature increase to that length of metal workpiece by heating in said third furnace section.

9. A method for controlling the exit temperature of a metal workpiece heated in a furnace, said method including the steps of:

providing a tandem arrangement of an i-furnace section, a set point temperature furnace section and a j-furnace section;

establishing a substantially constant furnace operating temperature in each of said i-furnace section and j-furnace section for heating a metal workpiece therein;

providing said set point temperature furnace section with a rapidly adjustable metal workpiece heating;

defining the location of a temperature set point from the entry end of said set point temperature furnace section according to the equation:

$$x = \frac{b}{\left(1 + \frac{\sum_i (c_i \cdot p_i)}{\sum_j (a_j \cdot p_j)}\right)}$$

where:
 x=the approximate distance of the set point from the entrance to the second furnace section (m);
 $a_j$=the active length (m) of the j-furnace section located before the set point temperature furnace section;
 j=an integer 1 . . . n corresponding to the number of furnace sections located before the set point furnace temperature section;
 b=the active length (m) of the set point temperature furnace section;
 $c_i$=the active length (m) of the i-furnace section located after the set point temperature furnace section;
 i=an integer 1 . . . n corresponding to the number of furnace sections located after the set point furnace temperature section;
 $p_j$=the average specific heating power of the j-furnace section (W/cm²); and
 $p_i$=the average specific heating power of the i-furnace section (W/cm²);

establishing an approximate desired temperature at said set point according to the equation:

$$T_s = T_o + \frac{T_f - T_o}{\left(1 + \frac{\sum_i (c_i \cdot p_i)}{\sum_j (a_j \cdot p_j)}\right)}.$$

where:
 $T_s$=the desired temperature at said set point (°C.);
 $T_o$=the temperature (°C.) of a workpiece entering said j-furnace section; and
 $T_f$=the desired temperature (°C.) for a metal workpiece discharged from said i-furnace section; and
 controlling the temperature of a metal workpiece discharged from said i-furnace section by rapidly adjusting metal workpiece heating by said set point temperature furnace section to maintain said desired temperature at said set point.

10. The method according to claim 9 wherein determined values of the active lengths of said $a_j$, b and $c_i$ furnace sections are approximately equal to lengths of the metal workpiece within the first, second and third furnace sections, respectively.

11. The method according to claim 9 wherein determined values of the active lengths of the first and third furnace sections are approximately equal to the lengths of the metal workpiece exposed to the average specific heating power within said furnace sections at any instant in time.

12. The method according to claim 9 including the further step of controlling the temperature of the metal workpiece at said set point by changing the rate of travel by the metal workpiece through said set point furnace temperature section.

13. A temperature control system for controlling the exit temperature of a metal workpiece from a furnace, said temperature control system including the combination of:

a tandem arrangement of at least first, second and third furnace sections, said second furnace section including an electrical induction heating coil;

a temperature sensor to provide an output signal corresponding to a measure of the temperature of the metal workpiece at a preestablished temperature set point within said second furnace section;

a comparator responsive to said output signal and a desired set point temperature signal for providing a temperature set point control signal; and a furnace heating controller responsive to said temperature set point control signal for rapidly altering the power level to said electrical induction heating coil to alter heating of a workpiece by said second furnace section in a manner to maintain a predetermined workpiece temperature at said preestablished temperature set point within said second furnace section.

14. The temperature control system of claim 13 wherein said second furnace section includes a workpiece heater having an operating range to an effective heating of a workpiece a further comprising a line speed controller for altering decreasing line speed if said increased power level exceeds a maximum power of the second furnace section.

15. The temperature control system according to claim 13 wherein said comparator includes a processor.

16. The temperature control system according to claim 13 wherein said furnace heating controller includes an electrical power supply.

17. The temperature control system according to claim 13 wherein said temperature sensor includes a pyrometer.

18. The temperature control system according to claim 13 wherein each of said first and third furnace sections include a furnace controller responsive to a thermocouple.

19. Apparatus to control a set point temperature in a furnace for heating workpieces, said apparatus including the combination of;

at least three furnace sections arranged tandem as a downstream furnace section, a set point control furnace section and a upstream furnace section for successively treating a workpiece;

a downstream furnace control for maintaining a substantially constant furnace operating temperature to deliver a workpiece from said downstream furnace at an elevated temperature that changes with parameters of varying workpiece thickness or changes to the workpiece line speed;

a temperature sensor for providing a measurement signal corresponding to a workpiece temperature at a predetermined site within said set point control furnace section, said measuring signal varying in response to said parameters;

a control responsive to a deviation of said measurement signal from a predetermined set point temperature signal for rapidly changing the delivery temperature of workpiece delivered from said set point control furnace section to always maintain a substantially constant workpiece temperature at said predetermined site; and an upstream furnace control for maintaining a substantially constant furnace operating temperature to heat a workpiece having a entry temperature that vary in response to said control to a predetermine delivery temperature that does not change with said parameters.

* * * * *